United States Patent

Esaki et al.

[11] Patent Number: 6,079,485
[45] Date of Patent: Jun. 27, 2000

[54] VEHICLE AIR-CONDITIONING SYSTEM WITH SEAT HEATING AND COOLING DEVICE

[75] Inventors: Hidenori Esaki; Akihiro Fujita; Yoshihiko Hotta, all of Wako, Japan

[73] Assignee: Honda Giken Kogyo Kabushiki Kaisha, Tokyo, Japan

[21] Appl. No.: 09/067,724

[22] Filed: Apr. 28, 1998

[30] Foreign Application Priority Data

Apr. 28, 1997 [JP] Japan ..................... 9-111546

[51] Int. Cl.⁷ .................................. B60H 3/00
[52] U.S. Cl. .................. 165/43; 165/42; 297/180.1; 62/244; 62/261; 219/202; 454/120; 454/907
[58] Field of Search .............. 165/42, 43; 297/180.1; 454/120, 907; 62/261, 244; 219/202

[56] References Cited

U.S. PATENT DOCUMENTS

| | | | |
|---|---|---|---|
| 2,134,724 | 11/1938 | McClanahan et al. | 165/43 |
| 4,572,430 | 2/1986 | Takagi et al. | 165/42 X |
| 5,524,439 | 6/1996 | Gallup et al. | 62/261 X |
| 5,921,314 | 7/1999 | Schuller et al. | 165/43 |

FOREIGN PATENT DOCUMENTS

| | | | |
|---|---|---|---|
| 0067510 | 4/1983 | Japan | 454/120 |
| 58-116216 | 7/1983 | Japan . | |
| 0191212 | 8/1987 | Japan | 454/120 |
| 5-277020 | 10/1993 | Japan . | |
| 6-293209 | 10/1994 | Japan . | |

*Primary Examiner*—Christopher Atkinson
*Attorney, Agent, or Firm*—Merchant & Gould P.C.

[57] ABSTRACT

A vehicle air-conditioning system includes a controller for controlling operation of an air-conditioner unit and operation of a seat heating and cooling device in interlocked relation such that operating conditions of the air-conditioner unit are automatically changed on the basis of the temperature of a vehicle seat, operating conditions of the seat heating and cooling device, or setting information of the seat heating and cooling device, or alternatively operating conditions of the seat heating and cooling device are automatically changed on the basis of the operating conditions of the air-conditioner unit or setting information of the air-conditioner unit.

7 Claims, 2 Drawing Sheets

VEHICLE AIR-CONDITIONING SYSTEM WITH SEAT HEATING AND COOLING DEVICE

BACKGROUND OF THE INVENTION

1. Field of the Invention:

The present invention relates to an air-conditioning system for vehicles having a seat heating and cooling device.

2. Description of the Related Art

Various air-conditioning units for vehicles are known as shown, for example, in Japanese Patent Laid-open Publication No. HEI 6-293209. Additional to the air-conditioner unit, a seat heater or a seat heating and cooling device may be used as an auxiliary air-conditioner.

One example of the known seat heater is disclosed in Japanese Patent Laid-open Publication No. SHO 58-116216. The disclosed seat heater is a flexible mat having a heating element embedded therein. In use, the seat heater is placed over a seat of the vehicle and powered by a battery of the vehicle. To secure quick heat-up of the seat heater in a low-temperature environment, a first thermostat set to turn on at 10° C. and turn off at a relatively high temperature such as 40° C. is provided between the battery and the heating element. A second thermostat set to turn on and off within an on-off differential temperature of the first thermostat is connected in parallel to the first thermostat to control a power feed to the heating element so as to keep a steady-state heated condition of the heating element after the first thermostat is turned off.

A typical example of the seat heating and cooling device is disclosed in Japanese Patent Laid-open Publication No. HEI 5-277020. The disclosed heating and cooling device is a built-in unit assembled integrally with a seat of the vehicle and generally comprises a number of air nozzles formed in the seat, a space defined below the seat and held in fluid communication with the air nozzles, a Peltier element (heating element) disposed within the space, and an electric fan disposed within the space for forcing air downstream toward the air nozzle across the Peltier element.

The seat heater or the seat heating and cooling device is used in combination with the air-conditioner, and the battery is used as a common power supply. However, they are driven separately in accordance with different items of information. In other words, the seat heater or the seat heating and cooling device operates independently from operating conditions of the air-conditioner unit, and vice versa. Accordingly, in order to keep the vehicle passenger compartment in a desired condition, the driver or a passenger of the vehicle is required to set operating conditions of the air-conditioner unit and operating conditions of the seat heater or seat heating and cooling device, separately. Such setting operation is tedious and time-consuming. Furthermore, while the air-conditioner unit and the seat heater or the seat heating and cooling device are in operation, the compartment temperature and the seat temperature vary separately, requiring e-setting of the operating conditions of the respective units which is tedious and time-consuming.

SUMMARY OF THE INVENTION

With the foregoing problems in view, it is an object of the present invention to provide an air-conditioning system for vehicles including a seat heating and cooling device, which is easy to handle and capable of creating an air-conditioned comfortable space inside the vehicle without requiring tedious and time-consuming manual setting and adjustment operations.

According to the present invention, there is provided an air-conditioning system for a vehicle, comprising: an air-conditioner unit for air-conditioning a compartment of the vehicle; a seat heating and cooling device for heating and cooling a seat of the vehicle; and a controller for controlling operation of the air-conditioner unit and operation of the seat heating and cooling device in interlocked relation such that operating conditions of the air-conditioner unit are automatically changed on the basis of a temperature of the seat, operating conditions of the seat heating and cooling device, or setting information of the seat heating and cooling device, or alternatively operating conditions of the seat heating and cooling device are automatically changed on the basis of the operating conditions of the air-conditioner unit or setting information of the air-conditioner unit.

The controller may set a setting temperature of the seat heating and cooling device to be equal to a setting temperature of the air-conditioner unit to thereby change the operating conditions of the seat heating and cooling device. Alternatively, the controller may set a setting temperature of the air-conditioner unit to be equal to a setting temperature of the seat heating and cooling device to thereby change the operating conditions of the air-conditioner unit.

The controller may include a first control unit for controlling operation of the air-conditioner unit, a second control unit for controlling operation of the seat heating and cooling device, the first and second control units being electrically connected together to perform data communication therebetween, and means for operationally interlocking the first and second control units.

Since the air-conditioner unit and the seat heating and cooling device are linked or interlocked in operation, it becomes possible to create a most comfortable space in the vehicle without requiring adjustment and resetting of at least one of the air-conditioner unit and the seat heating and cooling device.

Additionally, transfer of heat from the air-conditioner unit and the seat heating and cooling device to the driver or occupant of the vehicle is highly efficient and so energy consumption of the vehicle air-conditioning system can be reduced.

The above and other objects, features and advantages of the present invention will become apparent to those versed in the art upon making reference to the following description and accompanying drawings in which certain preferred structural embodiments of the invention are shown by way of illustrative examples.

DETAILED DESCRIPTION OF THE PREFERRED EMBODIMENTS

Certain preferred embodiments of the present invention will be described in greater detail with reference to the accompanying drawings.

Figure 1:
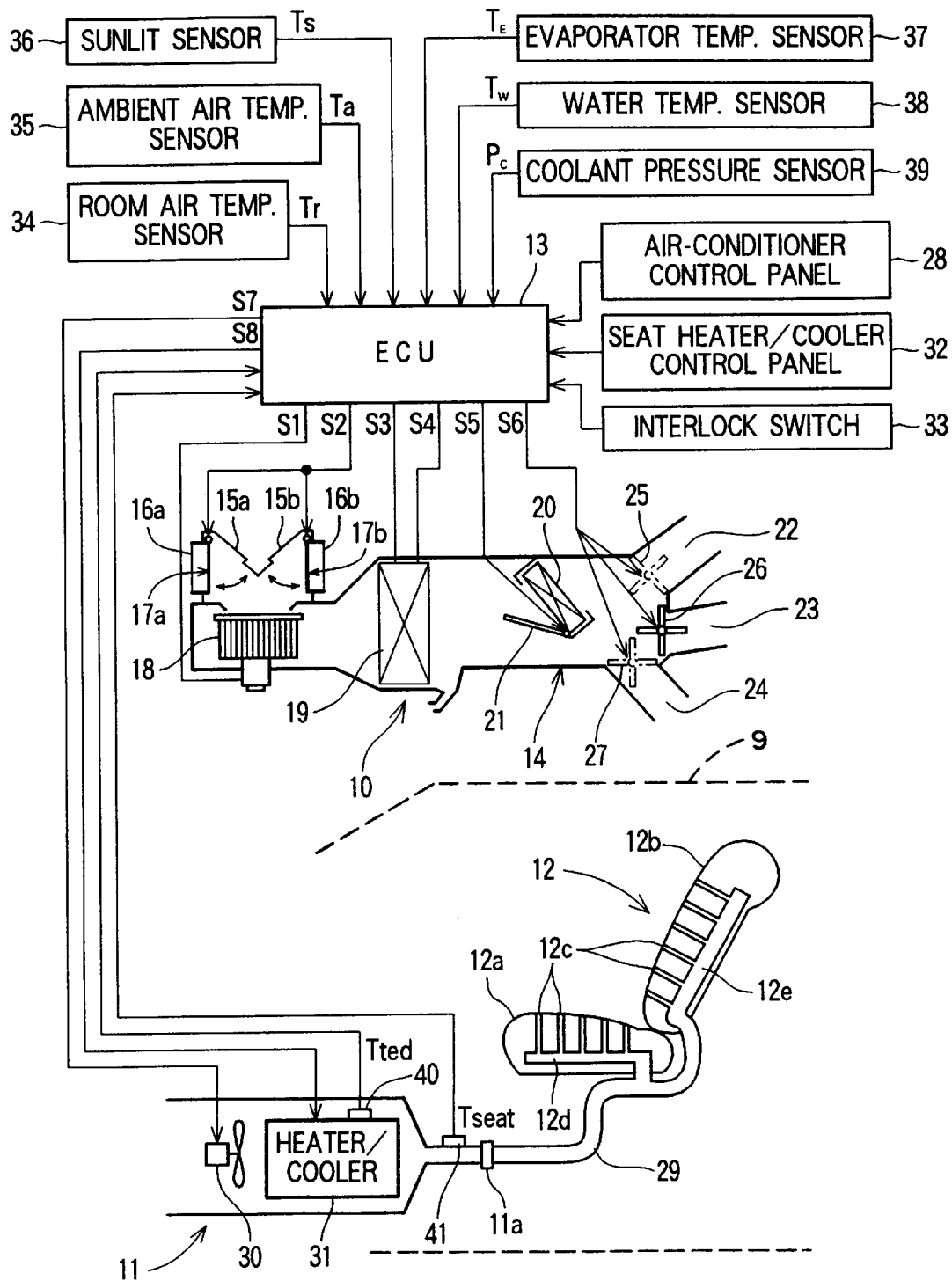
FIG. 1 is a block diagram showing the general structure of a vehicle air-conditioning system having a seat heating and cooling device according to a first embodiment of the present invention.

FIG. 1 shows in block diagram the general structure of an air-conditioning system for a vehicle according to a first embodiment of the present invention.

The air-conditioning system generally comprises an air-conditioner unit 10 for air-conditioning a passenger compartment of the vehicle 9, a seat heating and cooling device 11 for heating and cooling a seat 12 of the vehicle, and a control unit or controller 13 for controlling operation of the air-conditioner unit 10 and operation of the seat heating and cooling device 11 in linked or interlocked relation.

The air-conditioner unit 10 has an air duct 14 assembled in the vehicle body. The air duct 14 has an upstream end portion having formed therein a pair of ambient air inlets 15a, 15b for introducing therefrom ambient air (air outside the vehicle passenger compartment) into the air duct 14, and a pair of room air inlets 16a, 16a each disposed adjacent to a corresponding one of the ambient air inlets 15a, 15b in branched fashion for introducing therefrom room air (air inside the vehicle passenger compartment) into the air duct 14, and a pair of pivotally movable air inlet dampers 17a, 17b each disposed at the junction between one pair of ambient and room air inlets 15a, 16a; 15b, 16b for regulating the proportion of ambient air to room air to be introduced into the air duct 14. The air inlet dampers 17a, 17b are controllably driven by an air inlet control servomotor (not shown).

The air duct 14 contains a blower 18 disposed downstream of the air inlets 15a, 15b, 16a, 16b for forcing air (ambient air, room air, or the mixture thereof) downstream through the air duct 14, an evaporator 19 disposed downstream of the blower 18 for cooling air flowing therethrough, and a heater core 20 disposed downstream of the evaporator 19 for heating air flowing therethrough. The quantity of air blown from the blower 18 can be varied by changing the speed of a blower motor (not designated). The evaporator 19 forms part of a refrigerating cycle (not shown). Additional to the evaporator 19, the refrigerating cycle includes a variable displacement compressor for compressing a coolant, a condenser for cooling the compressed coolant to liquefy the coolant, a receiver tank for separating the coolant into gaseous phase and liquid phase, an expansion valve for expanding the liquefied coolant so that low-temperature, low-pressure, mist-like coolant can flow into the evaporator 19. The compressor is equipped with a magnet clutch (not shown) for performing on-off control of the compressor. Radiation of heat from the condenser is controlled by a condenser fan (not shown). The heater core 20 is a certain type of radiator having a coolant passage through which engine cooling water or coolant re-circulates. An air-mix door 21 is disposed between the evaporator 19 and the heater core 20 for regulating the mixing ratio of air passing through the heater core 20 and air bypassing the heater core 20 to thereby regulate the temperature of air blown off from the air duct 14. The air-mix door 21 is controllably driven by an air-mix control servomotor (not shown). The evaporator 19 may be disposed upstream of the blower 18.

The air duct 14 has, formed at its downstream end portion, an upper air outlet 22 for discharging air from defroster nozzles (not shown) toward a windshield (not shown) of the vehicle, a central air outlet 23 for discharging air from center and side air vents (not shown) toward the upper half of a body of the driver, and a lower air outlet 24 for discharging air from foot air vents (not shown) toward the lower half of the drivers body. The air outlets 22, 23, 24 are equipped with mode selection dampers 25, 26, 27, respectively, for regulating the amount of air discharged from the corresponding outlets 22–24. The mode selection dampers 25, 26, 27 are controllably driven by a mode selection control servomotor (not shown).

The air-conditioner unit 10 of the foregoing construction operates in accordance with instructions given initially from an air-conditioner control panel 28. The air-conditioner control panel 28 is assembled in an instrument panel (not shown) of the vehicle. The control panel 28 has various operation switches (not shown) including an A/C switch for starting and stopping operation of the air-compressor (not shown) of the refrigerating cycle, an AUTO switch for changing the operation mode of the air-conditioner unit 10 between an automatic mode and a manual mode, mode selection switches for selecting the blow-off mode among a FACE mode (only the air outlet 23 is open), a BI-LEVEL mode (the air outlets 23 and 24 are open), a FOOT mode (only the air outlet 24 is open), a FOOT/DEF mode (the air outlets 22, 24 are open), and a DEF mode (only the air outlet 22 is open), and a temperature setting switch for manually setting a target temperature of air blown from selected one or ones of the air outlets 22, 23, 24.

The seat 12 has a seat body 12a and a seat back 12b each having a plurality of air nozzles 12c. The air nozzles 12c of the seat body 12a are connected together by an air duct 12d formed in the seat body 12a. Similarly, the air nozzles 12c of the seat back 12b are connected together by an air duct 12e formed in the seat back 12b. The air duct 12d and the air duct 12e are connected via an air supply pipe 29 to an air outlet 11a of the seat heating and cooling device 11. In the illustrated embodiment, the air supply pipe 29 is connected to the seat 12 from the underside thereof. As an alternative, the pipe 29 may be connected to the seat 12 from a lateral direction of the seat 12. The seat heating and cooling device 11 has an air inlet 11b opening to the vehicle passenger compartment.

The seat heating and cooling device 11 is designed to supply temperature-controlled air (hot air or cool air) or temperature-uncontrolled air to the air nozzles 12c of the seat 12, and to this end, it includes an electric fan 30 and a heater/cooler unit 31. The heater/cooler unit 31 comprises a thermoelectric converter capable of converting electric energy directly into thermal energy. Examples of such thermoelectric converter include a thermoelectric heating pump, a thermoelectric cooler, a Peltier element and the like. The heating and cooling device 11 may be disposed beneath the seat body 12a.

The seat heating and cooling device 11 operates in accordance with instructions given initially from a seat heater/cooler control panel 32 which is assembled, for example, in the instrument panel near the air-conditioner control panel 28. The control panel 32 has various operation switches (not shown) including a mode selection switch for selecting one operation mode from among a hot air supply mode (HOT mode), a cool air supply mode (COOL mode) and a room air supply mode (FAN mode), an on/off switch for starting and stopping operation of the seat heating and cooling device 11, and a temperature setting switch for setting the temperature of air ejected from the air nozzles 12c of the seat 12. The seat heater/cooler control panel 32 may be disposed on one side of the seat 12.

The air-conditioner unit 10 and the seat heating and cooling device 11 can operate, under the control of the control unit 13, either independently or in interlocked condition, in accordance with instructions given from the respective control panels 28, 32. To interlock operation of the air-conditioner unit 10 and operation of the seat heating and cooling device 11, the vehicle air-conditioning system of the present invention has an interlock switch 33. The interlock switch 33 is preferably arranged on the instrument panel of the vehicle at a position close to both of the air-conditioner control panel 28 and the seat heater/cooler control panel 32. As an alternative, the interlock switch 33 may be arranged on either the air-conditioner control panel 28 or the seat heater/cooler control panel 32.

The control unit 13 in the illustrated embodiment is a microcomputer-based electronic control unit (ECU) having an internal read-only-memory (ROM) in which a control program is stored. To take environmental conditions of the vehicle into account, the control unit 13 is supplied with a detection signal Tr from a room-air temperature sensor 34, a detection signal Ta from an ambient-air temperature sensor 35, a detection signal Ts from a sunlit sensor 36 for detecting the amount of illumination of sunlight, a detection signal Te from an evaporator temperature sensor 37 for detecting the temperature of inlet air at a position immediately downstream of the evaporator 19, a detection signal Tw from a water temperature sensor 38 for detecting the temperature of cooling water circulating through the heater core 20, a detection signal Pc from a coolant pressure sensor 39 for detecting the pressure of coolant circulating through the refrigerating cycle, a detection signal Tted from a temperature sensor 40 for detecting the temperature of the heater/cooler unit 31, and a detection signal Tseat from a seat-temperature sensor 41. The control unit 13 is further supplied with various operation signals supplied from the air-conditioner control panel 28, seat heater/cooler control panel 32 and interlock switch 33. The sensors 34, 35, 36 are disposed at appropriate portions of the vehicle which are well known to one having ordinary skill in the art. The sensor 41 is disposed adjacent to the air outlet 11a of the seat heating and cooling device 11 for detecting the temperature of air discharged from the seat heating and cooling device 11. The sensor 41 may be disposed near the air nozzles 12c of the seat 12 for detecting the temperature of air ejected from the air nozzles 1c. In the latter case, the detected temperature may be construed as representing a seat temperature.

The control unit 13 generates a control signal S1 for controlling the speed of the blower motor (not designated) to change the quantity of air blown from the blower 18, a control signal S2 for controllably driving the inlet air control servomotor (not shown) to adjust the ratio of room air to ambient air, a control signal S3 for controllably driving the magnet clutch of the compressor of the refrigerating cycle to perform on-off control of the compressor, a control signal S4 for controllably driving the condenser fan of the refrigerating cycle, a control signal S5 for controllably driving the air-mix control servomotor (not shown) to regulate the opening (or position) of the air-mix door 21, and a control signal S6 for controllably driving the mode selection control servomotor (not shown) to selectively control the respective positions of the mode selection dampers 25, 26, 27. The control unit 13 further generates a control signal S7 for controlling the speed of the fan motor (not designated) to change the quantity of air blown from the electric fan 30, and a control signal S8 for controlling the output power of the heater/cooler unit 31.

The control unit 13, when it detects the ON state of the interlock switch 33, operates to link or interlock operation of the air-conditioner unit 10 and operation of the seat heating and cooling device 11 in such a manner that operating conditions of said air-conditioner unit 10 are automatically changed on the basis of a temperature of the seat 12, operating conditions of the seat heating and cooling device 11, or setting information of the seat heating and cooling device 11, or alternatively operating conditions of the seat heating and cooling device 11 are automatically changed on the basis of the operating conditions of the air-conditioner unit 10 or setting information of the air-conditioner unit 10.

The vehicle air-conditioning system of the present invention operates as follows.

When the interlock switch 33 is in the OFF state, the control unit 13 controls operations of the air-conditioner unit 10 and the seat heating and cooling device 11 separately in accordance with setting information given from the associated control panels 28, 32. For example, in the case where the air-conditioner unit 10 is driven while the seat heating and cooling device 11 is kept de-energized, the control unit 13 controls operation of the air-conditioner unit 10, on the basis of various signals supplied from the control panel 28 and sensors 34–39, so as to create a desired air-conditioned comfortable space in the vehicle passenger compartment, in a manner known per se. In the case where the seat heating and cooling device 11 is driven alone, the control unit 13 controls operation of the seat heating and cooling device 11, on the basis of the various signals supplied from the control panel 32 and sensors 40 and 41, in a manner described below.

In the case where the HOT mode (hot air supply mode) is selected from the seat heater/cooler control panel 32, the control unit 13 drives the electric fan 30 and sets the heater/cooler unit 31 to operate in a heating mode. The control unit 13 regulates a power feed to the heater/cooler unit 31 to control heating power of the heater/cooler unit 31 on the basis of a preset temperature given from the control panel 32, a temperature of the heater/cooler unit 31 detected by the temperature sensor 40, and a temperature of air detected by the temperature sensor 41.

In the case where the COOL mode (cool air supply mode) is selected from the seat heater/cooler control panel 32, the control unit 13 drives the electric fan 30 and sets the heater/cooler unit 31 to operate in a cooling mode. The control unit 13 regulates a power feed to the heater/cooler unit 31 to control cooling power of the heater/cooler unit 31 on the basis of a preset temperature given from the control panel 32 a temperature of the heater/cooler unit 31 detected by the temperature sensor 40, and a temperature of air detected by the temperature sensor 37.

In the case where the FAN mode (room air supply mode) is selected from the seat heater/cooler control panel 32, the control unit 13 drives the electric fan 30 only, with the heater/cooler unit 31 kept de-energized.

In the case where the interlock switch 33 is in the ON state and the air-conditioner unit 10 and the seat heating and cooling device 11 are in operation, the control unit 33 controls operation of the seat heating and cooling device 11, on the basis of various signals supplied from the air-conditioner control panel 28 and sensors 34–39 (in preference to those signal supplied from the seat heater/cooler control panel 32 and sensors 40, 41). The control unit 13 operates to drive the electric fan 30 and control a power feed to the heater/cooler unit 31 via control signals S7, S8 in such a manner that air is ejected from the air nozzles 12c at the same temperature as a preset temperature given from the air-conditioner control panel 28. Thus, the control unit 13 sets the setting temperature of the seat heating and cooling device 11 to be equal to the setting temperature of the air-conditioner unit 10.

As an alternative, the temperature of air ejected from the air nozzles 12c may differ from the setting temperature of the air-conditioner unit 10 so as to improve the comfortableness of the passenger compartment. For instance, if the COOL mode, for example, is selected by the air-conditioner control panel 28, the control unit 13 will operate to drive the electric fan 30 and control a supply of power to the heater/ cooler unit 31 in such a manner that air is ejected from the air nozzles 12c at a temperature lower than the room temperature by a predetermined temperature (such as about 2 to about 5 degrees).

Alternatively, if the HOT mode is selected by the air-conditioner control panel 28, the control unit 13 will operate to drive the electric motor 30 and control a supply of power to the heater/cooler unit 31 in such a manner that air is ejected from the air nozzles 12c at a temperature higher than the room temperature by a predetermined temperature (such as about 2 to about 5 degrees).

It was proved by experiments that a most comfortable condition is achieved when the room air temperature is in the range of 23 to 25° C. and the seat temperature is in the range of 30 to 33° C. The temperature difference between the seat 12 and the driver (or a passenger) having an average body temperature of about 37° C. is smaller than the temperature difference between room air and the driver. However, since the seat 12 is in contact with the body of the driver, heat transfer between the seat 12 and the driver (in the form of radiation of heat from the driver to the seat 12) is substantially the same as heat transfer between room air and the driver (in the form of radiation of heat from the driver to the room. The room air temperature (23 to 25° C.) and the seat temperature (30 to 33° C.) are hereinafter referred to as "comfortable room temperature" and comfortable seat temperature, respectively. Taking the comfortable room and seat temperatures into consideration, it is possible according to the present invention to modify the operation of the control unit in a manner as described below.

When the air-conditioner unit 10 is operating in the COOL mode in the season of, for example, summer, if the setting temperature of the air-conditioner unit 10 is below the seat temperature or the comfortable room temperature (23 to 25° C.), the control unit 13 automatically lowers the setting temperature of the seat heating and cooling device 11 below the current seat temperature or the comfortable seat temperature (30 to 33° C.) on the basis of the setting temperature of the air-conditioner unit 10, thereby changing operating conditions of the seat heating and cooling device 11 to lower the temperature of air ejected from the air nozzles 12c and the seat temperature.

On the other hand, when the air-conditioner unit 10 is operating in the HOT mode in the winter time, if the setting temperature of the air-conditioner unit 10 is above the seat temperature or the comfortable room temperature, the control unit 13 automatically raises the setting temperature of the seat heating and cooling device 11 above the current seat temperature or the comfortable seat temperature on the basis of the setting temperature of the air-conditioner unit 10, thereby changing operating conditions of the seat heating and cooling device 11 to raise the temperature of air ejected from the air nozzles 12c and the seat temperature. The degree of change (decrease or increase) of the setting temperature of the seat heating and cooling device 11 may be variable (in direct proportion, for example) with the difference between the setting temperature of the air-conditioner unit 10 and the seat temperature or the comfortable room temperature.

In spring or autumn, when the setting temperature of the air-conditioner unit 10 is equal to the comfortable room temperature, the control unit 13 automatically makes the setting temperature of the seat heating and cooling device 11 equal to the comfortable seat temperature, thereby changing operating conditions of the seat heating and cooling device 11 to secure the comfortable seat temperature. When the setting temperature of the air-conditioner unit 10 is equal to the seat temperature, operation of the seat heating and cooling unit 11 is stopped.

When the air conditioner system is operating in the winter or summer time, it may occur that the quantity of air blown from the air-conditioner unit 10 may be maximized to rapidly raise or lower the room temperature. In this instance, the control unit 13 automatically changes operating conditions of the seat heating and cooling device 11 so as to increase the power of the seat heating and cooling device 11. In spring or autumn, the air-conditioner unit 10 may be operated to blow only a small quantity of air. In this case, the control unit 13 automatically changes operating conditions of the seat heating and cooling device 11 so as to reduce the power of the seat heating and cooling device 11. As an alternative, the control unit 13 may stop operation of the seat heating and cooling device 11. The degree of change (increase or decrease) of power of the seat heating and cooling device 11 may be variable (in direct proportion, for example) with the air quantity blown from the air-conditioner unit 10.

When the interlock switch 33 is turned off, the electric fan 30 and the heater/cooler unit 31 of the seat heating and cooling device 11 are operated independently from operation of the air-conditioner unit 10. Thereafter, when the interlock switch 33 is turned on again, operation of the seat heating and cooling device 11 is forcibly linked with operation of the air-conditioner unit 10 in the manner as described above.

In the operation modes described above, when the interlock switch 33 is on, the control unit 13 controls operation of the seat heating and cooling device 11 on the basis of various signals supplied from the air-conditioner control panel 28 and the setting temperature, flow quantity of air of the air-conditioner unit 10. Alternatively, the control unit 13 may control operation of the air-conditioner unit 10 on the basis of various signal supplied from the heater/cooler control panel 32 and operating conditions of the seat heating and cooling device 11, in a manner as described below.

When the air-conditioning system is operating in summer, for example, if the setting temperature of the seat heating and cooling device 11 is below the seat temperature or the comfortable seat temperature, the control unit 13 automatically lowers the setting temperature of the air-conditioner unit 10 to rapidly cool the room air in a short period of time. In this instance, the quantity of air blown from the air-conditioner unit 10 may be increased to accelerate cooling of the room air. Additionally, the air quantity blown from the FACE air outlet 23 may be greater than the air quantity blown from the FOOT air outlet 24.

On the other hand, in the winter time, when the setting temperature of the seat heating and cooling device 11 is above the seat temperature or the comfortable seat temperature, the control unit 13 automatically increases the setting temperature of the air-conditioner unit 10 to rapidly heat the room air in a short period of time. In this instance, the quantity of air blown from the air-conditioner unit 10 may be increased to accelerate heating of the room air. Additionally, the air quantity blown from the FACE air outlet 23 may be set to be substantially equal to the air quantity blown from the FOOT air outlet 24.

The degree of change (increase or decrease) of the setting temperature of the air-conditioner unit 10 and/or the degree of change (increase or decrease) of the air quantity blown from the air-conditioner unit 10 may be variable (in direct proportion, for example) with the difference between the seat setting temperature and the seat temperature or between the seat setting temperature and the comfortable seat temperature.

When the air-conditioning system is operating in spring or autumn, for example, if the setting temperature of the seat heating and cooling device 11 is equal to the seat temperature or the comfortable seat temperature, the control unit 13 automatically makes the setting temperature of the air-conditioner unit 10 equal to the comfortable room temperature, thereby changing operating conditions of the air-conditioner unit 10 to secure the comfortable seat temperature. In this instance, the quantity of air blown from the air-conditioner unit 10 may be decreased. Additionally, the air quantity blown from the FOOT air outlet 24 may be set to be substantially equal to the air quantity blown from the FACE air outlet 23.

As an alternative, operation of the air-conditioner unit 10 may be stopped.

The seat temperature and output data (voltage and current values of the electric fan 30 and heater/cooler unit 31) of the seat heating and cooling device 11 have a close correlation with each other. Accordingly, in place of the setting temperature of the seat heating and cooling device 11, the output data of the seat heating and cooling device 11 may be used to vary the setting temperature of the air-conditioner unit 10 under the control of the control unit 13 in a manner as described below.

For example, when the seat heating and cooling device 11 is operating in the HOT mode, the control unit 13 automatically varies the setting temperature of the air-conditioner unit 10 on the basis of the output data from the seat heating and cooling device 11 so as to control operation of the air-conditioner unit 10. In this instance, the quantity of air blown from the air-conditioner unit 10 (corresponding to the speed of the blower 18) may be varied with the quantity of air blown from the seat heating and cooling device 11 (corresponding to the speed of the electric fan 30). Additionally, the FACE air outlet 23 and the FOOT air outlet 24 may be adjusted to have substantially the same opening area, allowing the same quantity of hot air to be blown from the respective air outlets 23, 24.

Similarly, when the seat heating and cooling device 11 is operating in the COOL mode, the control unit 13 automatically varies the setting temperature of the air-conditioner unit 10 on the basis of the output data from the seat heating and cooling device 11 so as to control operation of the air-conditioner unit 10. In this instance, the quantity of air blown from the air-conditioner unit 10 (corresponding to the speed of the blower 18) may be varied with the quantity of air blown from the seat heating and cooling device 11 (corresponding to the speed of the electric fan 30). Additionally, the FOOT air outlet 24 may be adjusted to have a larger opening area than the FACE air opening 23, enabling the FOOT air outlet 24 to blow more amount of cool air than the FACE air outlet 23.

The degree of change (increase or decrease) of the setting temperature of the air-conditioner unit 10 and/or the degree of change (increase or decrease) of the air quantity blown from the air-conditioner unit 10 may be variable (in direct proportion, for example) with the output power of seat heating and cooling device 11.

When the seat heating and cooling device 11 is operating with minimum power, the control unit 13 automatically makes the setting temperature of the air-conditioner unit 10 equal to the comfortable room temperature, thereby changing operating conditions of the air-conditioner unit 10 to secure the comfortable seat temperature. In this instance, the quantity of air blown from the air-conditioner unit 10 may be reduced to a minimum. Additionally, the FACE air outlet 23 and the FOOT air outlet 24 may be adjusted to have substantially the same opening area so that substantially the same quantity of air is blown from the FACE and FOOT air outlets 23, 24. As an alternative, operation of the air-conditioner unit 10 may be stopped.

The control unit 13 may utilize setting data or operating conditions of the air-conditioner unit 10 for enabling the seat heating and cooling device 11 to change a heating or cooling pattern of the seat 12 to thereby form a uniform temperature distribution on the seat surface. To this end, the seat 12 is equipped with a plurality of independently controllable thermoelectric converters, such as Peltier elements (not shown), arranged in a predetermined pattern to heat or cool a plurality of uniformly divided areas of the seat surface, separately, via hot or air ejected from the air nozzles 12c formed in the respective seat surface areas, and a plurality of sunlit sensors (not shown) each disposed on one of the seat surface areas.

In the case where the air-conditioner unit 10 is arranged to adjust temperatures of portions of the vehicle passenger compartment in accordance with intensities of sunlight detected by sunlit sensors disposed at the respective portions of the passenger compartment, the temperature adjustment of the air-conditioner unit 10 is linked with temperature adjustment achieved by the seat heating and cooling device 10 so as to provide a uniform temperature distribution of the seat surface. For example, when the setting temperature of the air-conditioner unit 10 differs from the comfortable room air temperature or the comfortable seat temperature, the control unit 13 automatically regulate powers of the respective thermoelectric converters of the seat heating and cooling device 11 such that a part of the seat surface which is subjected to air blown from the air-conditioner unit 10 becomes equal to the comfortable room air temperature or the comfortable seat temperature. Thus, the seat 12 has a uniform temperature distribution over the entire area of the seat surface, thereby providing pleasant feeling to an occupant of the seat 12.

Figure 2:
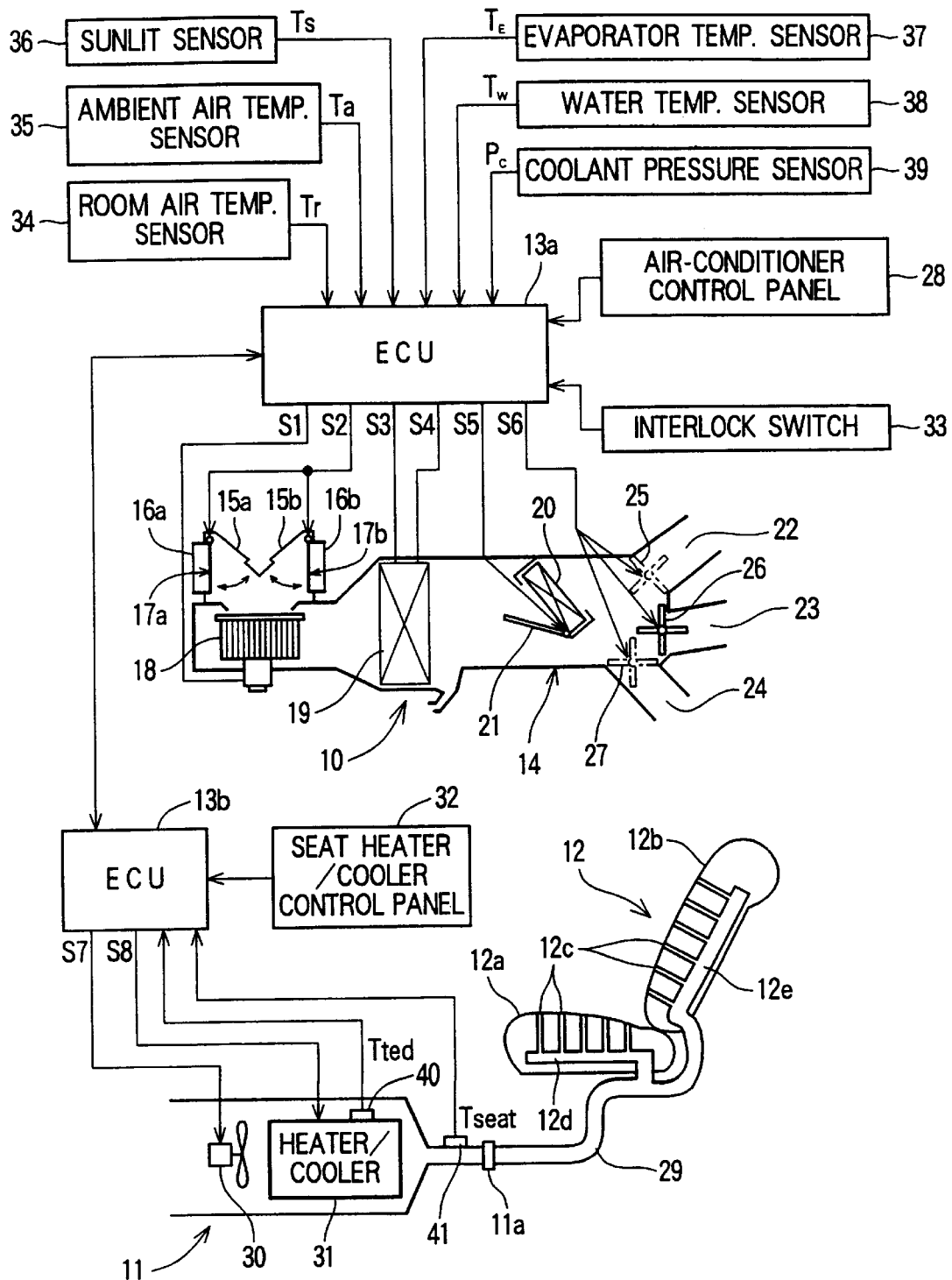
FIG. 2 is a block diagram showing the general structure of a vehicle air-conditioning system having a seat heating and cooling device according to a second embodiment of the present invention.

FIG. 2 shows a modified vehicle air-conditioning system according to the present invention. This air-conditioning system differs from the air-conditioning system shown in FIG. 1 in that two electronic control units 13a and 13b are provided.

The control unit 13a is supplied with various command signals from an air-conditioner control panel 28 and controls operation of the air-conditioner unit 10. The control unit 13b is supplied with various command signals from a seat heater/cooler control panel 32 and controls operation of the seat heating and cooling device 11. The control units 13a and 13b are electrically connected together to transmit data in both directions between them. The data include information about operating conditions of the air-conditioner unit 10 and seat heating and cooling device 11 and information based on signals supplied from various sensors.

An interlock switch 33 is disposed adjacent to the air-conditioner control panel 32 for the purpose of interlocking operation of the air-conditioner unit 10 and operation of the seat heating and cooling device 11.

When the interlock switch 33 is off, the control unit 13a controls operation of the air-conditioner unit 10 in accordance with data (command signals) from the air-conditioner control panel 28, and the control unit 13b controls operation of the seat heating and cooling device 11 in accordance with data (command signals) from the seat heater/cooler control panel 32, in the same manner as describe above with respect to the embodiment shown in FIG. 1.

When the interlock switch 33 is on, a seat temperature, operating conditions of the seat heating and cooling device 11 and setting conditions of the seat heating and cooling device 11 are transmitted from the control unit 13b to the control unit 13a so as to control operation of the air-conditioner unit 10 in interlocked relation to operation of the seat heating and cooling device 11 such that operating conditions of the air-conditioner unit 10 are automatically changed on the basis of the data supplied from the control unit 13b associated with the seat heating and cooling device 11, in the same manner described above with respect to the embodiment shown in FIG. 1. At the same time, a room air temperature, operating conditions of the air-conditioner unit 10 and setting conditions of the air-conditioner unit 10 are transmitted from the control unit 13a to the control unit 13b so as to control operation of the seat heating and cooling device 11 in interlocked relation to operation of the air-conditioner unit 10 such that operating conditions of the seat heating and cooling device 11 are automatically changed on the basis of the data supplied from the control unit 13a associated with the air-conditioner unit 10, in the same manner described above with respect to the embodiment shown in FIG. 1.

It is possible according to the present invention to disable the interlock switch 33 while the AUTO switch (not show) on the air-conditioner control panel 28 is in the OFF state.

Because the air-conditioner unit and the seat heating and cooling device of the vehicle air-conditioning system are linked or interlocked in operation, it is possible to change operating conditions of one of the air-conditioner unit and the seat heating and cooling device by setting or resetting operating conditions of the other of the air-conditioner unit and the seat heating and cooling device. It is, therefore, possible to air-condition the vehicle passenger compartment in a relatively short time and at a desired temperature. Additionally, the air-conditioner unit and the seat heating and cooling device can operate at the same setting temperature, and so the room air temperature can be changed efficiently by air blown from the air-conditioner unit and surface temperature of the seat.

Obviously, various minor changes and modifications of the invention are possible in the light of the above teaching. It is, therefore, to be noted that within the appended claims the present invention may be practiced otherwise than as specifically described.

What is claimed is:

1. An air-conditioning system for a vehicle, comprising:

an air-conditioner unit adapted for air-conditioning the vehicle;

a seat adapted for the vehicles;

a seat heating and cooling device for heating and cooling the seat; and a controller for controlling operation of said air-conditioner unit and operation of said seat heating and cooling device in interlocked relation such that one of operating conditions of said air-conditioner unit is automatically changed based on one of a temperature of the seat, operating conditions of said seat heating and cooling device, and setting information of said seat heating and cooling device, and operating conditions of said seat heating and cooling device are automatically changed based on one of operating conditions of said air-conditioner unit and setting information of said air-conditioner unit.

2. An air-conditioning system according to claim 1, wherein said controller sets a setting temperature of said seat heating and cooling device to be equal to a setting temperature of said air-conditioner unit to thereby change the operating conditions of said seat heating and cooling device.

3. An air-conditioning system according to claim 1, wherein said controller sets a setting temperature of said air-conditioner unit to be equal to a setting temperature of said seat heating and cooling device to thereby change the operating conditions of said air-conditioner unit.

4. An air-conditioning system according to claim 1, wherein said controller includes a first control unit for controlling operation of said air-conditioner unit, a second control unit for controlling operation of said seat heating and cooling device, said first and second control units being electrically connected together to perform data communication therebetween, and means for operationally interlocking said first and second control units.

5. An air-conditioning system according to claim 4, wherein said first control unit sets a setting temperature of said air-conditioner unit to be equal to a setting temperature of said seat heating and cooling device to thereby change the operating conditions of said air-conditioner unit.

6. An air-conditioning system according to claim 4, wherein said second control unit sets a setting temperature of said seat heating and cooling device to be equal to a setting temperature of said air-conditioner unit to thereby change the operating conditions of said seat heating and cooling device.

7. An air-conditioning system according to claim 1, wherein said controller includes a single control unit for controlling operation of said air-conditioner unit and operation of said seat heating and cooling device, and an interlock switch for interlocking operation of said air-conditioner unit and operation of said seat heating and cooling device.

* * * * *